United States Patent [19]
Kim

[11] Patent Number: 5,832,118
[45] Date of Patent: Nov. 3, 1998

[54] TEXTURE CLASSIFICATION APPARATUS EMPLOYING COARSENSESS AND DIRECTIVITY OF PATTERNS

[75] Inventor: Jin-Hun Kim, Seoul, Rep. of Korea

[73] Assignee: Daewoo Electronics Co., Ltd., Seoul, Rep. of Korea

[21] Appl. No.: 734,217

[22] Filed: Oct. 21, 1996

[30] Foreign Application Priority Data

May 8, 1996 [KR] Rep. of Korea ................. 1996 14968

[51] Int. Cl.$^6$ ..................................... G06K 9/62
[52] U.S. Cl. ........................... 382/224; 382/170; 382/194; 382/262
[58] Field of Search ........................ 358/261.1; 382/170, 382/168, 224, 197, 194, 196, 195, 203, 262, 172, 245, 227, 169

[56] References Cited

U.S. PATENT DOCUMENTS

| | | | |
|---|---|---|---|
| 4,193,097 | 3/1980 | Kurahayashi et al. | 358/261.1 |
| 4,468,703 | 8/1984 | Fujiwara et al. | 358/464 |
| 4,535,473 | 8/1985 | Sakata | 381/46 |
| 4,628,532 | 12/1986 | Stone et al | 382/197 |
| 4,817,187 | 3/1989 | Lien | 382/253 |
| 4,958,375 | 9/1990 | Reilly et al. | 382/159 |
| 4,987,603 | 1/1991 | Ohnishi et al. | 382/203 |
| 5,060,081 | 10/1991 | Shimura | 358/443 |
| 5,086,490 | 2/1992 | Peppers et al. | 382/318 |
| 5,179,599 | 1/1993 | Formanek | 382/172 |
| 5,181,254 | 1/1993 | Schweizer et al. | 382/100 |
| 5,295,198 | 3/1994 | Maney | 382/225 |
| 5,341,439 | 8/1994 | Hsu | 382/103 |
| 5,357,093 | 10/1994 | Netter et al. | 235/462 |
| 5,416,855 | 5/1995 | Geiger | 382/254 |
| 5,555,028 | 9/1996 | Kim | 382/262 |
| 5,630,037 | 5/1997 | Schindler | 382/171 |
| 5,649,068 | 7/1997 | Boser et al. | 382/159 |
| 5,668,898 | 9/1997 | Tatsuta | 382/168 |

OTHER PUBLICATIONS

Russ, The Image Processing Handbook, 1994, pp. 165–166.

*Primary Examiner*—Joseph Mancuso
*Assistant Examiner*—Timothy M. Johnson
*Attorney, Agent, or Firm*—Pennie & Edmonds LLP

[57] ABSTRACT

An apparatus for classifying a textured image based on pattern coarseness and directivity comprises: a quantizer for obtaining a quantized image from the textured image, the quantized image containing a plurality of pixels each of which is represented by one of N quantized values, N being a positive integer; a scanning block for scanning the quantized image along M scanning directions, M being a positive integer, to thereby provide M scanned images; a grey level mean runlengths configuration block for providing a set of runlengths by counting runlengths of pixels having a same quantized value, for each of the M scanned images and each of the N quantized values, to thereby provide M x N sets of runlengths, providing M×N mean runlengths by averaging each set of runlengths, and forming an M×N matrix whose elements are the mean runlengths; pattern coarseness decision block for determining a coarseness of the textured image by using the matrix; pattern directivity decision block for determining a directivity of the textured image by using the matrix; and texture classification block for classifying the textured image according to the coarseness and the directivity.

15 Claims, 7 Drawing Sheets

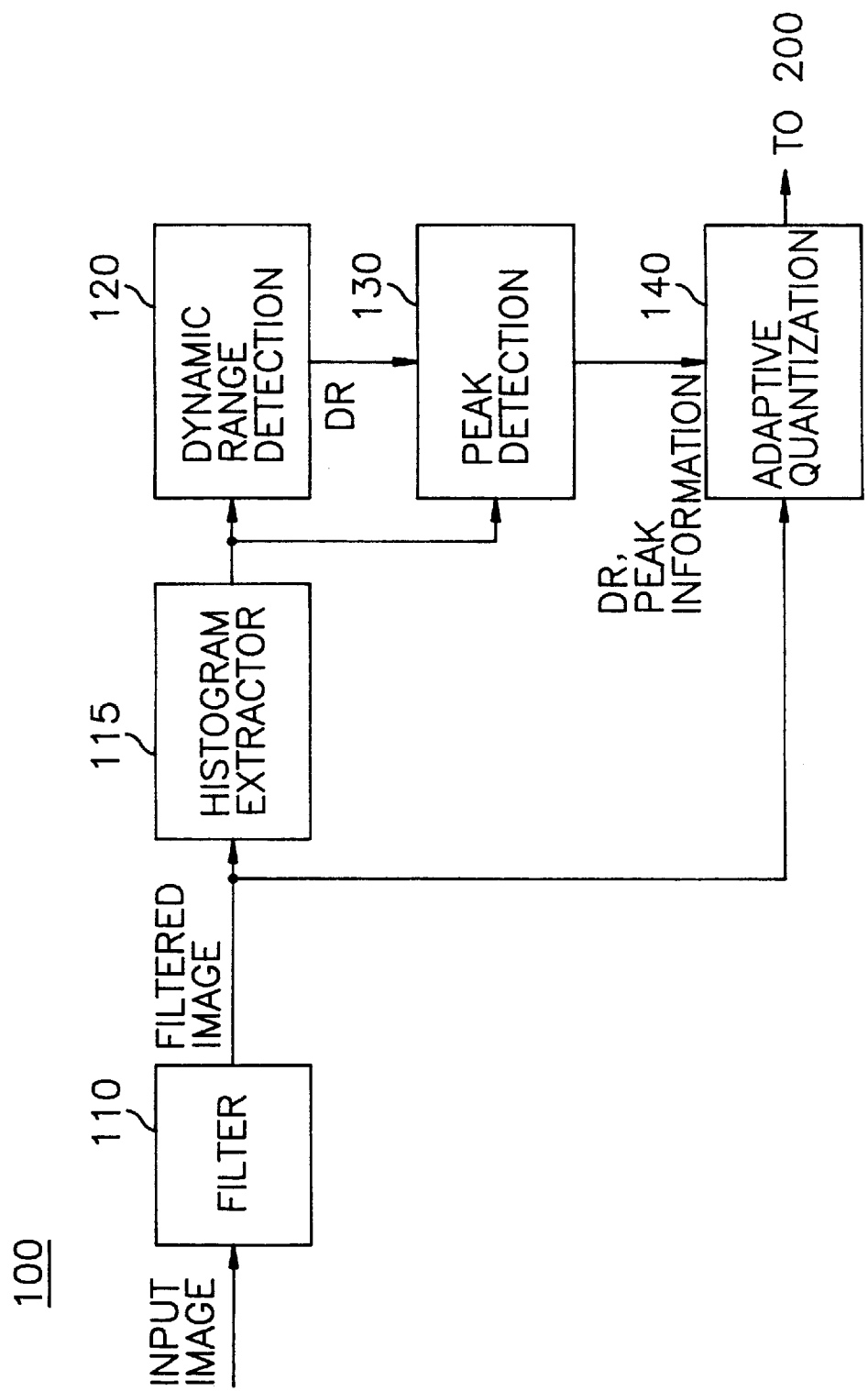

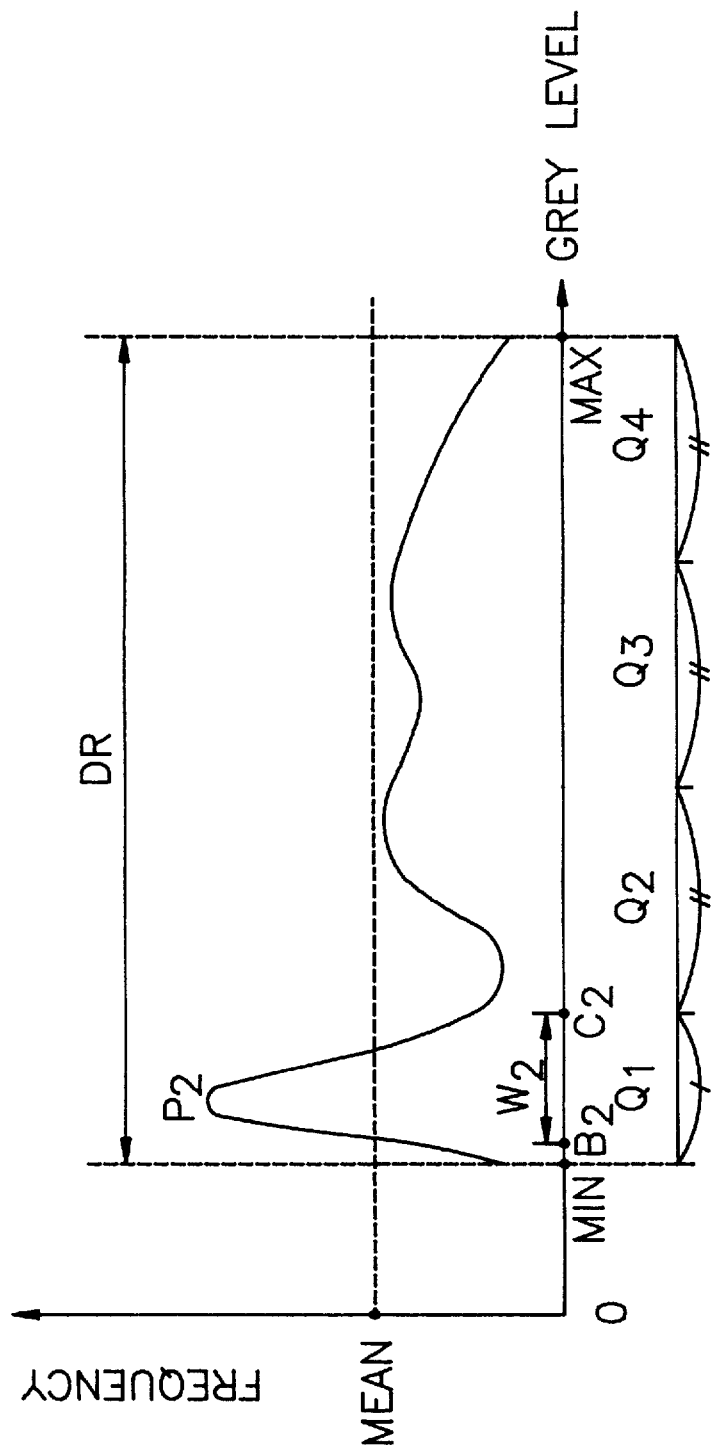

HORIZONTAL DIRECTION(H)

VERTICAL DIRECTION(V)

FIRST DIAGONAL DIRECTION($D_1$)

SECOND DIAGONAL DIRECTION($D_2$)

FIG.5

| SCANNING DIRECTIONS | | | | | |
|---|---|---|---|---|---|
| H | $L_{11}$ | $L_{12}$ | $L_{13}$ | $L_{14}$ | |
| V | $L_{21}$ | $L_{22}$ | $L_{23}$ | $L_{24}$ | |
| $D_1$ | $L_{31}$ | $L_{32}$ | $L_{33}$ | $L_{34}$ | |
| $D_2$ | $L_{41}$ | $L_{42}$ | $L_{43}$ | $L_{44}$ | |
| | $Q_1$ | $Q_2$ | $Q_3$ | $Q_4$ | QUANTIZATION INTERVAL |

TEXTURE CLASSIFICATION APPARATUS EMPLOYING COARSENSESS AND DIRECTIVITY OF PATTERNS

1. Field of the Invention

The present invention relates to an apparatus for classifying a textured image; and, more particularly, to an apparatus which classifies the textured image based on coarseness and directivity of texture patterns therein.

2. Description of the Prior Art

Texture perception is an important part of human vision. Objects may often be distinguished by their characteristic textures in spite of similar colors and shapes. Textural cues are important in the perception of orientation and relative distances of surfaces. Although a precise definition of texture does not exist, it is generally viewed as consisting of a large number of elements, each in some degrees visible, and, on the whole, densely and evenly arranged over a field of view such that there is a distinct characteristic spatial repetitiveness in the pattern.

In general, an apparatus for classifying texture patterns of an input image determines which of predefined classes each of the input patterns belongs to, wherein such classification result is used to recognize the input image.

In such an apparatus, there are two approaches usually taken to classify texture patterns: a statistical approach, and a structural or syntactic approach.

The statistical approach attempts a global characterization of texture, wherein statistical properties of the spatial distribution of grey levels of pixels are used as texture descriptors. The key feature of this approach is the sole dependence of the description on point properties, with no explicit use of elements or subregions, which makes this approach less effective than the structural approach in many cases.

On the other hand, the structural approach conceives a texture as an arrangement of a set of spatial subpatterns according to certain placement rules. Texture patterns can be formed from simple pattern primitives such as straight and curved lines. However, the selection of pattern primitives may be a difficult task, since there are no general rules available for the task and, in essence, it depends on heuristics and the experience or preference of each user.

The texture of a surface is characterized by such properties as fine, coarse, smooth, granulated, random, etc. Of these properties, coarseness and directivity may be used as important features in characterizing a texture pattern. Coarseness is a property that is related to sizes of pattern primitives. Directivity refers to a degree or tendency of whether the pattern primitives lie along one direction or are scattered along all directions. If the coarseness and the directivity are effectively quantified, they can be used as effective criteria for classifying a textured image.

SUMMARY OF THE INVENTION

It is, therefore, a primary object of the invention to provide an apparatus for classifying a textured image based on coarseness and directivity of patterns therein.

In accordance with the present invention, there is provided an apparatus for classifying a textured image containing a plurality of pixels each of which is represented by a grey level value, which comprises:

a quantizer for obtaining a quantized image from the textured image, the quantized image containing a plurality of pixels each of which is represented by one of N quantized values, N being a positive integer;

a scanning block for scanning the quantized image along M scanning directions, M being a positive integer, to thereby provide M scanned images;

a grey level mean runlengths configuration block for providing a set of runlengths by counting runlengths of pixels having a same quantized value, for each of the M scanned images and each of the N quantized values, to thereby provide M×N sets of runlengths, providing M×N mean runlengths by averaging each set of runlengths, and forming an M x N matrix whose elements are the mean runlengths;

pattern coarseness decision block for determining a coarseness of the textured image by using the matrix;

pattern directivity decision block for determining a directivity of the textured image by using the matrix; and texture classification block for classifying the textured image according to the coarseness and the directivity.

BRIEF DESCRIPTION OF THE DRAWINGS

The above and other objects and features of the present invention will become apparent from the following description of preferred embodiments given in conjunction with the accompanying drawings, in which:

FIG. 2 shows a detailed block diagram of a pre-processing block incorporated in the apparatus shown in FIG. 1;

FIGS. 3A to 3C illustrate dynamic ranges (DR) and peaks of histograms of input images;

FIG. 5 depicts an exemplary matrix formed by mean runlengths calculated with respect to each quantization interval and each scanning direction.

DETAILED DESCRIPTION OF THE PREFERRED EMBODIMENTS

Figure 1:
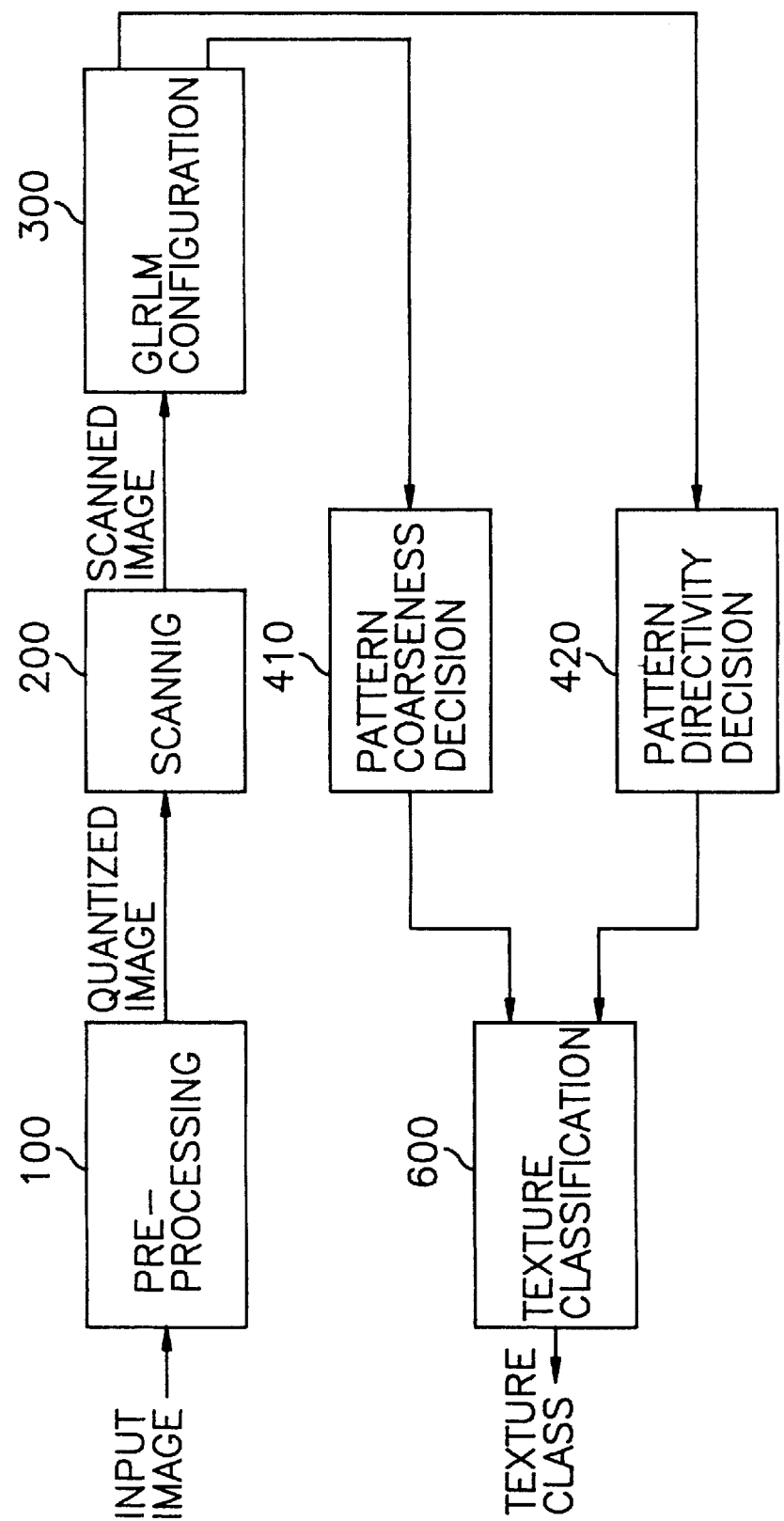
FIG. 1 represents a schematic block diagram of a texture classification apparatus in accordance with the present invention.

Referring to FIG. 1, there is shown a schematic block diagram of a texture classification apparatus in accordance with the present invention. The apparatus comprises a pre-processing block 100, a scanning block 200, a gray level runlength matrix ("GLRLM") configuration block 300, a pattern coarseness decision block 410, a pattern directivity decision block 420, and a texture classification block 600.

The invention is primarily directed to a textured image, wherein a texture pattern appears repeatedly as in a desert or a farmland. Such an input image is fed to the pre-processing block 100.

At the pre-processing block 100, the textured input image is pre-processed to be applied to subsequent processes. Specifically, the textured image is converted to a quantized image wherein each pixel therein has one of several quantized values.

Referring to FIG. 2, there is shown a detailed block diagram of the pre-processing block 100 which includes a filter 110, a histogram extractor 115, a dynamic range detection block 120, a peak detection block 130, and an adaptive quantization block 140.

The filter 110 is used to obtain a filtered image by removing noises, e.g., impulse noises, contained in the input image. A cross-shaped median filter known for good edge maintenance may be used to reduce such noises to preserve texture patterns of small sizes. The filtering process using the median filter is performed on a pixel-by-pixel basis. Other lowpass filters known in the art may be used for the same purpose.

Figure 3A:
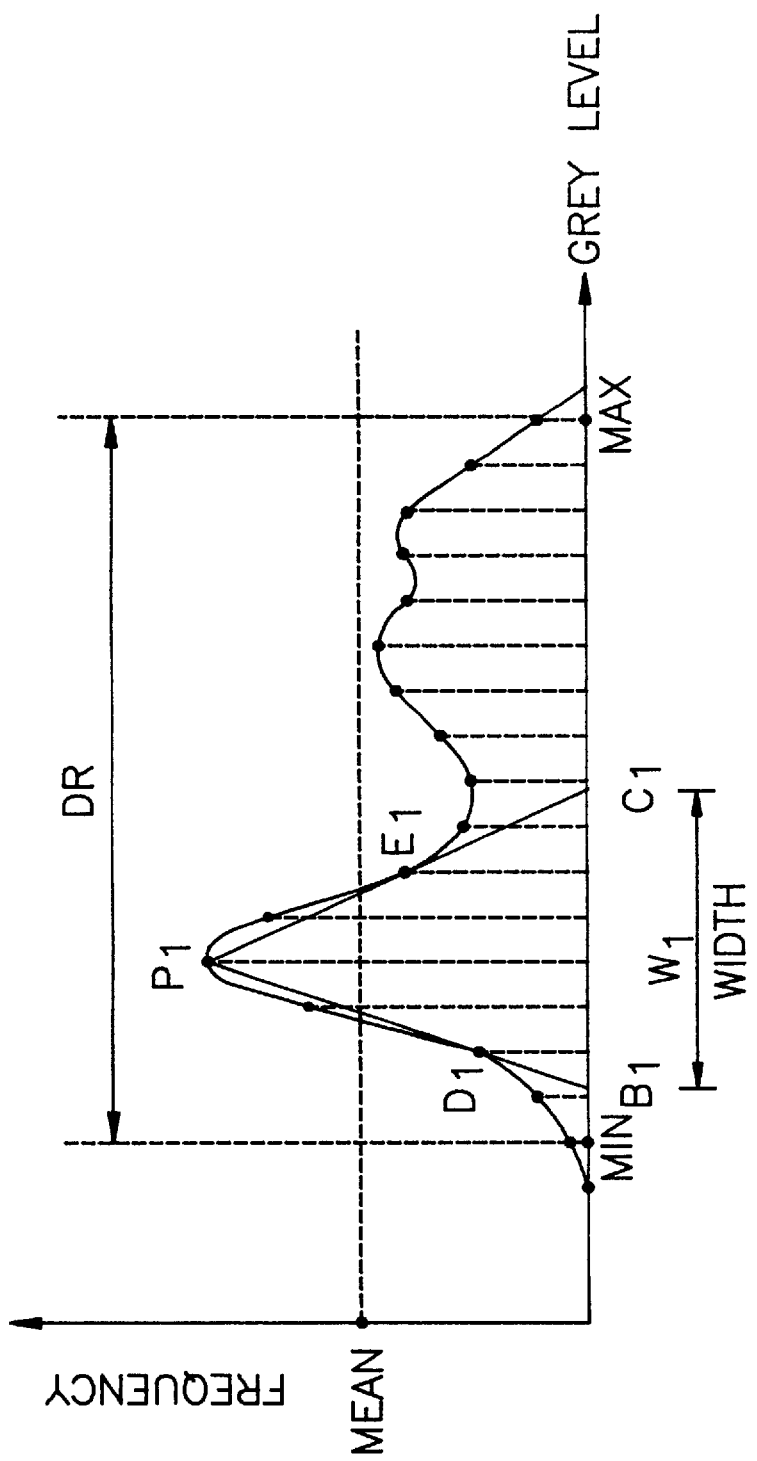
Figure 3C:
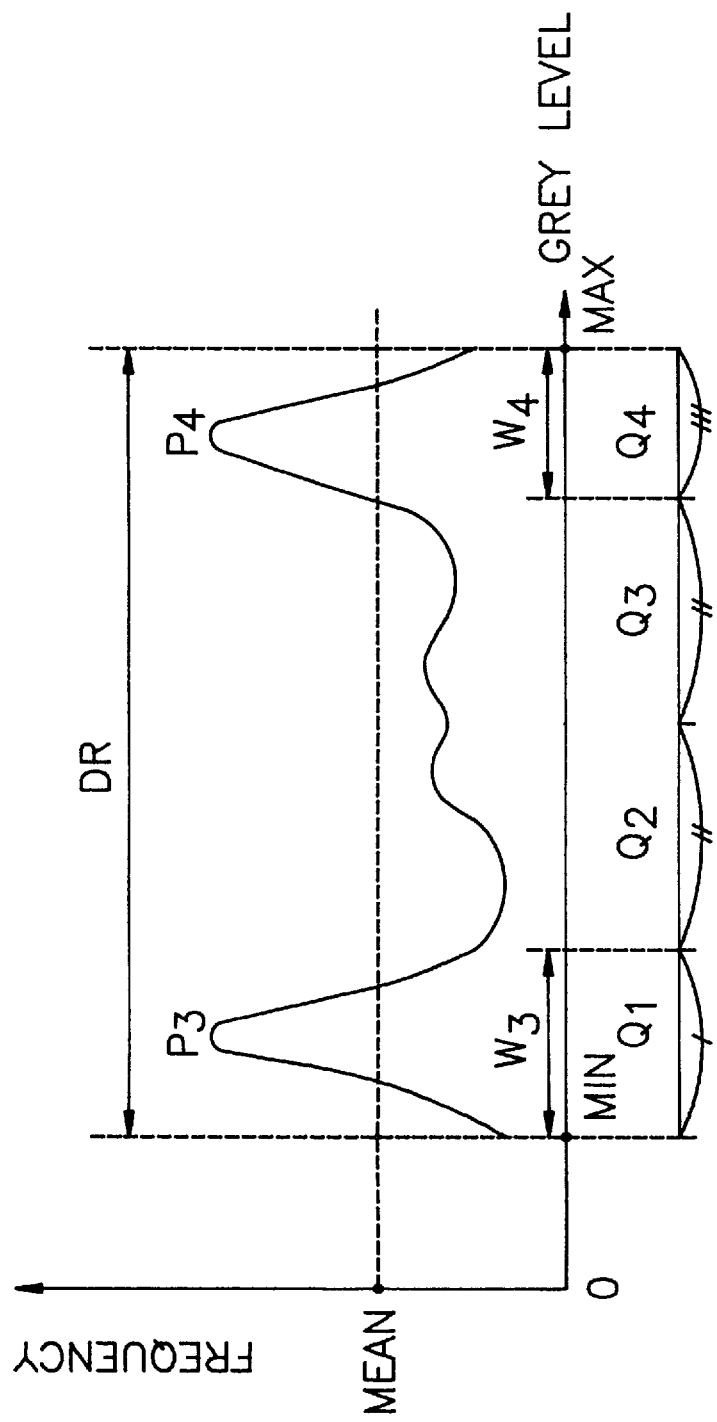
Figure 4A:
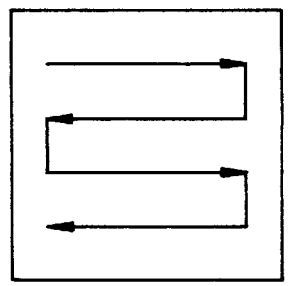
FIGS. 4A to 4D depict 4 scanning directions employed at the scanning block shown in FIG. 1.
Figure 4B:
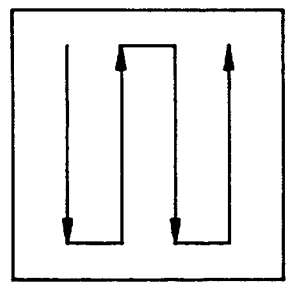
Figure 4C:
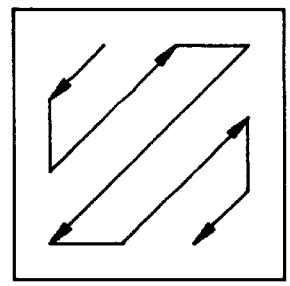
Figure 4D:
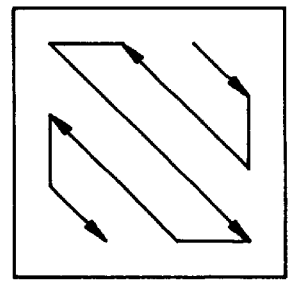

The filtered image from the filter 110 is passed to the histogram extractor 115, wherein a histogram of the filtered image is obtained by plotting frequencies of pixels in the image as a function of grey level values. In case the input image is large or contains a number of distinct textures, it may not be proper to deal with the entire image at a time. In that case, the input image may be divided into a plurality of subimages or processing blocks before it is fed to the histogram extractor 115. In the histogram extractor 115, number of pixels in the image or subimage assuming each gray level, i. e., 0 to 255, is counted, to thereby provide a frequency for each grey level value. In FIGS. 3A to 3C, there are shown exemplary histograms, wherein the horizontal axis represents the gray levels and the vertical axis corresponds to the frequency of pixels having each grey level in the input image or subimage.

The histogram is fed to the dynamic range detection block 120 which determines a dynamic range ("DR") of grey levels for the input image. DR may be defined as a range of grey level values between a maximum and a minimum of grey level values whose frequencies are not less than 1 pixel in the histogram. In FIGS. 3B and 3C, DR is determined as a section between MIN and MAX.

DR and the histogram is fed to the peak detection block 130 wherein peaks, e.g., the one around a peak point Pi shown in FIG. 3A is detected within DR. Prior to detecting peaks, the histogram may be smoothed, i.e., small fluctuations in the histogram are suppressed by averaging it. Peak of a histogram may be defined as a cluster of grey levels that encloses a peak point, e.g., P1, which is a local maximum of a histogram and its corresponding frequency is larger than a threshold. The threshold may be determined as an average frequency of the histogram, which is represented as MEAN in FIGS. 3A to 3C. The presence of a peak indicates that a certain cluster of grey levels appears far more frequently than the others in an input image.

After a peak point is located, width of the peak is determined by using e.g., the method presented by Fumiaki Tomita et al., in "Description of Texture by Structural Analysis", IEEE transactions on pattern analysis and machine intelligence, Vol.PAM1-4, NO.2, March 1982.

Specifically, to determine a peak width $W_1$, the peak around the peak point $P_1$ is approximated to a triangle as shown in FIG. 3A. Let $D_1$ and $E_1$ denote the left and the right point whose frequencies are lower than MEAN and which are nearest to $P_1$, A left and a right bottom points $B_1$, and $C_1$ of the peak are the intersecting points of the extension of the line $P_1D_1$ and $P_1E_1$ with the baseline of the histogram, i.e., the horizontal axis, respectively. The width $W_1$ is determined as the length of the interval $B_1C_1$. A location of the peak may also be represented by the left and the right point.

DR and peak information from the peak detection block 130 and the filtered image from the filter 110 are provided to the adaptive quantization block 140, wherein the peak information includes, e.g., a width and a location of a peak.

At the adaptive quantization block 140, the dynamic range of the input image is subdivided into a predetermined number, N, of quantization intervals, or equivalently, (N−1) quantization thresholds are determined, N being 4 for the example shown in FIGS. 3B and 3C. Then, by representing all the pixels having grey level values included in a quantization interval with a corresponding quantized value, a quantized image is formed, wherein each pixel therein is represented by one of N quantized values.

The quantization of the input image, i.e., the division of the dynamic range DR, is performed considering the peak information. Specifically, as illustrated in FIGS. 3B and 3C, the N quantization intervals, e.g., $Q_1$ to $Q_4$, are decided in such a manner that when the widths of all the detected peaks are larger than a predetermined value of peak width threshold, the dynamic range DR is divided into N quantization intervals of a same width; otherwise, a quantization interval is allotted to such a peak whose width is smaller than the peak width threshold, and then, remaining quantization intervals are allotted to the remaining dynamic range.

That is, if the width $W_2$ of the peak shown in FIG. 3B is larger than the peak width threshold, $Q_1$ to $Q_4$ are determined to have a same width; and if $W_2$ is smaller than the threshold, $Q_1$ is allotted to the peak around $P_2$ and the rest of the dynamic range DR is divided evenly into three sections $Q_2$, $Q_3$ and $Q_4$. The peak width threshold may be obtained by dividing the dynamic range DR by the number of total quantization intervals N, e.g., 4 in FIGS. 3B or 3C. It should be noted that the quantization interval $Q_1$ is extended to MIN, because the interval between MIN and the left bottom point $B_2$ of the peak is too small to allot one whole quantization interval thereto.

Similarly, if there are two peaks in the dynamic range DR as shown in FIG. 3C, the widths $W_3$ and $W_4$ of the peaks around $P_3$ and $P_4$, respectively, are first determined. When both $W_3$ and $W_4$, are smaller than the peak width threshold, $Q_1$ and $Q_4$ are allotted to each of the peaks, respectively, and the remaining dynamic range is divided into two quantization intervals, $Q_2$ and $Q_3$, of a same width.

Subsequently, the quantized image is applied to the scanning block 200 shown in FIG. 1. At the scanning block 200, a number of directional scannings are performed on the quantized image. Referring to FIGS. 4A to 4D, there are illustrated a multiplicity of scanning directions for performing scanning at the scanning block 200 in accordance with the present invention, the directions being a horizontal(H), a vertical(V), a first diagonal($D_1$) between upper right and lower left corners and a second diagonal($D_2$) between upper left and lower right corners. In accordance with the present embodiment, 4 scanned images for 4 directions are provided for a quantized image.

The scanned images are provided to the GLRLM configuration block 300, wherein runlengths, i.e., the number of successive pixels in a scanned image that belongs to a same quantization interval, are counted for each of the scanning directions and each of the quantization intervals. As there are 4 scanning directions and 4 quantization intervals, 16 sets of runlengths are determined. Then, mean runlengths are decided by averaging the runlengths included in the same set.

As shown in FIG. 5, at the GLRLM configuration block 300, a GLRL matrix, constituted by the mean runlength $L_{ij}$, is formed, wherein i represents 4 scanning directions, e.g., H, V, $D_1$ and $D_2$, and j identifies 4 quantization intervals or quantized values. For example, $L_{11}$ to $L_{14}$ in FIG. 5 designate the mean runlengths corresponding to the quantized intervals, $Q_1$ to $Q_4$, for the horizontally scanned image, respectively.

The GLRL matrix is coupled to the pattern coarseness decision block 410 and to the pattern directivity decision block 420, wherein a coarseness and a directivity of the input texture pattern are determined, respectively, from the GLRL matrix by using predefined criteria. More specifically, the coarseness of the texture pattern may be computed from the following equation.

$$\sum_{i=1}^{M} \sum_{j=1}^{N} L_{ij}/(N \cdot M - K) \qquad \text{Eq.1}$$

wherein, $L_{ij}$ denotes a mean runlength for ith scanning direction; and jth quantization interval or quantized values, i and j being positive integers ranging from 1 to M and 1 to N, respectively; M and N are the number of scanning directions and quantization intervals, respectively; and K is the number of zero elements within the GLRL matrix.

On the other hand, the directivity of the texture pattern may be defined according to the following equations.

$$\text{Directivity} = MAX(D_H, D_V, D_{D1}, D_{DD2}) \qquad \text{Eq. 2}$$

$$D_H = \sum_{j=1}^{N} \frac{L_{1j}}{L_{2j}}, \qquad \text{Eq. 3}$$

$$D_V = \sum_{j=1}^{N} \frac{L_{2j}}{L_{1j}},$$

$$D_{D1} = \sum_{j=1}^{N} \frac{L_{3j}}{L_{4j}},$$

$$D_{D2} = \sum_{j=1}^{N} \frac{L_{4j}}{L_{3j}}$$

wherein $D_H$, $D_V$, $D_{D1}$ and $D_{D2}$ are related to the degree of directivity along the horizontal (H), the vertical (V), the first diagonal (D1) and the second diagonal (D2) directions, respectively. It may be noted that, as the directivity gets larger, the textured image tends to show more lines or line-like pattern along one direction than the others.

Thereafter, the outputs from the pattern coarseness decision block 410 and the pattern directivity decision block 420 are fed to the texture classification block 600, wherein the input image is classified into a multiplicity of classes depending on the coarseness and the directivity values. For example, if we classify the textured image into M1 classes according to the coarseness and into M2 classes according to the directivity, the image is classified as one of M1×M2 classes.

As demonstrated above, a textured image is classified at the texture image classification apparatus of the present invention. The result may be used in recognizing texture patterns in a computer vision system.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for classifying a textured image containing a plurality of pixels each of which is represented by a gray level value, which comprises:

quantization means for obtaining a quantized image from the textured image, the quantized image containing a plurality of pixels each of which is represented by one of N quantized values, N being a positive integer;

means for scanning the quantized image along M scanning directions, M being a positive integer, to thereby provide M scanned images;

means for providing a set of runlengths by counting runlengths of pixels having a same quantized value, for each of the M scanned images and each of the N quantized values, to thereby provide M×N sets of runlengths;

means for providing M×N mean runlengths by averaging each set of runlengths;

means for forming an M×N matrix whose elements are the mean runlengths;

means for determining a coarseness of the textured image by using the matrix;

means for determining a directivity of the textured image by using the matrix; and means for classifying the textured image according to the coarseness and the directivity, wherein an element of the M×N matrix is denoted as $L_{ji}$, i being a positive integer ranging from 1 to M which designates each of the M scanning directions and j being a positive integer ranging from 1 to N which represents each of the N quantized values and the coarseness is determined as:

$$\sum_{i=1}^{M} \sum_{j=1}^{N} L_{ij}/(N \cdot M - K),$$

K being an integer representing the number of zero elements within the M×N matrix.

2. The apparatus of claim 1 further comprising a lowpass filter, wherein the textured image is applied to the lowpass filter before it is applied to the quantization means.

3. The apparatus of claim 2, wherein the lowpass filter is a median filter.

4. The apparatus of claim 3, wherein the lowpass filter is a cross shaped median filter.

5. The apparatus of claim 1, wherein the quantization means includes:

means for obtaining a histogram by plotting frequencies of pixels in the textured input image as a function of grey level values;

means for smoothing the histogram;

means for detecting a dynamic range in the histogram, the dynamic range being a range of grey level values between a maximum and a minimum of grey level values whose frequencies are not less than 1 pixel in the histogram;

means for detecting peaks in the histogram wherein a location and a width of each of the peaks are determined;

means for comparing the width of each of the peaks with a peak width threshold; and means for allotting a quantization interval for each of the peaks whose width is smaller than the peak width threshold, and dividing the remaining dynamic range into (N-P) quantization intervals, P being an integer ranging from 0 to N and representing the number of quantization intervals allotted to the peaks.

6. The apparatus of claim 5, wherein said means for detecting peaks contains:

means for detecting a peak point which is a local maximum of the histogram and whose frequency is larger than an average frequency of the histogram;

means for detecting a left and a right points whose frequencies are smaller than the average frequency and which are nearest to the peak point;

means for determining a left bottom point and a right bottom point which are intersecting points of extensions of lines connecting the peak point with the left point and connecting the peak point with the right point, respectively, with a baseline of the histogram; and means for determining the width of the peak as the length between the left and the right bottom points.

7. The apparatus of claim 5, wherein the peak width threshold is obtained by dividing the width of the dynamic range by N.

8. The apparatus of claim 1, wherein said M is 4 and said 4 scanning directions are horizontal, vertical, diagonal between an upper right and a lower left corners of the quantized image and diagonal between an upper left and a lower right corners of the quantized image.

9. The apparatus of claim 1, wherein said M is 4, said 4 scanning directions are horizontal, vertical, diagonal between an upper right and a lower left corners of the quantized image and diagonal between an upper left and a lower right corners of the quantized image, the directions corresponds to i=1 to i=4 in that order and the directivity is determined as:

$$Directivity = MAX(D_H, D_V, D_{D1}, D_{D2})$$

wherein:

$$D_H = \sum_{j=1}^{N} \frac{L_{1j}}{L_{2j}},$$

$$D_V = \sum_{j=1}^{N} \frac{L_{2j}}{L_{1j}},$$

$$D_{D1} = \sum_{j=1}^{N} \frac{L_{3j}}{L_{4j}},$$

$$D_{D2} = \sum_{j=1}^{N} \frac{L_{4j}}{L_{3j}}.$$

10. The apparatus of claim 1, wherein said classification means categorizes the textured image as one of M1 classes according to the coarseness and as one of M2 classes according to the directivity, M1 and M2 being positive integers, to thereby classify the textured image as one of M1×M2 classes.

11. An apparatus for classifying a textured image containing a plurality of pixels, each pixel being represented by a grey level value, which comprises:

quantization means for obtaining a quantized image by quantizing the textured image based on the distribution characteristic of the pixels in the textured image, wherein the quantized image contains a plurality of pixels represented by one of N quantized values whose quantization intervals have widths adaptively determined based on the distribution characteristic of the pixels in the textured image, N being a positive integer;

means for scanning the quantized image along M scanning directions, M being a positive integer, to thereby provide M scanned images;

means for providing a set of runlengths by counting runlengths of pixels having a same quantized value, for each of the M scanned images and each of the N quantized values, to thereby provide M×N sets of runlengths;

means for providing M×N mean runlengths by averaging each set of runlengths;

means for forming an M×N matrix whose elements are the M×N mean runlengths;

means for determining a coarseness of the textured image by using the matrix;

means for determining a directivity of the textured image by using the matrix; and means for classifying the textured image based on the coarseness and the directivity, wherein an element of the M×N matrix is denoted as $L_{ij}$ being a positive integer ranging from 1 to N which represents each of the N quantized values and i being a positive integer ranging from 1 to M which designates each of the M scanning directions and the coarseness is determined as:

$$\sum_{i=1}^{M} \sum_{j=1}^{N} L_{ij}/(N \cdot M - K)$$

K being an integer representing the number zero elements within the M×N matrix.

12. The apparatus of claim 11, wherein the quantization means includes:

means for obtaining a histogram by plotting frequencies of the pixels in the textured input image as a function of grey level values;

means for smoothing the histogram;

means for detecting a dynamic range in the histogram, the dynamic range being a range of grey level values between a maximum and a minimum of grey level values whose frequencies are not less than one pixel in the histogram;

means for detecting peaks in the histogram wherein a location and a width of each of the peaks are determined;

means for comparing the width of each of the peaks with a peak width threshold; and means for allotting a quantization interval for each of the peaks whose width is smaller than the peak width threshold, and dividing the remaining dynamic range into (N-P) quantization intervals, P being an integer ranging from 0 to N and representing the number of quantization intervals allotted to the peaks.

13. The apparatus of claim 12, wherein the peaks detecting means contains:

means for detecting a peak point which is a local maximum of the histogram and whose frequency is larger than an average frequency of the histogram;

means for detecting a left and a right points nearest to the peak point whose frequencies are smaller than the average frequency;

means for determining a left bottom point and a right bottom point which are intersecting points of extensions of lines connecting the peak point with the left point and connecting the peak point with the right point, respectively, with a baseline of the histogram; and means for determining the width of the peak as the length between the left and the right bottom points.

14. The apparatus of claim 13, wherein the peak width threshold is obtained by dividing the width of the dynamic range by N.

15. The apparatus of claim 11, wherein said M is 4, said 4 scanning directions being horizontal, vertical, diagonal between an upper right and a lower left corners of the quantized image and diagonal between an upper left and a lower right corners of the quantized image and the directions corresponding to i=1 to i=4 in that order and the directivity is determined as:

$$Directivity = MAX(D_H, D_V, D_{D1}, D_{D2})$$

wherein:

$$D_H = \sum_{j=1}^{N} \frac{L_{1j}}{L_{2j}},$$

$$D_V = \sum_{j=1}^{N} \frac{L_{2j}}{L_{1j}},$$

$$D_{D1} = \sum_{j=1}^{N} \frac{L_{3j}}{L_{4j}},$$

-continued $$D_{D2} = \sum_{j=1}^{N} \frac{L_{4j}}{L_{3j}}.$$

* * * * *